United States Patent [19]

Wong et al.

[11] Patent Number: 5,304,885
[45] Date of Patent: Apr. 19, 1994

[54] ELECTRIC MOTOR ARMATURE WITH WINDING END PROTECTION

[75] Inventors: Chi-Nung Wong; Kam-Shing Mok, both of Hong Kong, Hong Kong

[73] Assignee: Johnson Electric S.A., Switzerland

[21] Appl. No.: 849,012

[22] PCT Filed: Jul. 16, 1991

[86] PCT No.: PCT/GB91/01174
§ 371 Date: Apr. 21, 1992
§ 102(e) Date: Apr. 21, 1992

[87] PCT Pub. No.: WO92/02069
PCT Pub. Date: Feb. 6, 1992

[30] Foreign Application Priority Data

Jul. 16, 1990 [GB] United Kingdom .................. 9015604

[51] Int. Cl.$^5$ .............................................. H02K 1/06
[52] U.S. Cl. .................................. 310/216; 310/264; 310/270
[58] Field of Search ............... 310/216, 217, 218, 270, 310/271, 273, 264

[56] References Cited

U.S. PATENT DOCUMENTS

| | | | |
|---|---|---|---|
| 3,214,621 | 10/1965 | Quear et al. | 310/215 |
| 3,315,105 | 4/1967 | Moore, Jr. | 310/211 |
| 3,831,268 | 8/1974 | Boyd et al. | 29/598 |
| 3,882,336 | 5/1975 | Boyd et al. | 310/216 |

FOREIGN PATENT DOCUMENTS

| | | |
|---|---|---|
| 1245285 | 9/1971 | United Kingdom . |
| 2208974 | 4/1989 | United Kingdom . |
| 2222317 | 2/1990 | United Kingdom . |

Primary Examiner—Steven L. Stephan
Assistant Examiner—D. R. Haszko
Attorney, Agent, or Firm—Ostrolenk, Faber, Gerb & Soffen

[57] ABSTRACT

An armature for a fractional horsepower motor is provided with spiders 10A having spokes 20 and arms 24. The spiders 10A fit at at least an end of laminated armature stacks around which the armature windings are wrapped. The spokes 20 are profiled to provide upstanding rounded surfaces 23 for the windings and to reduce drag. Reduction in drag and the profiled shape of the spokes 20 improves air flow through the motor and reduces the tendency of build up of carbon dust in the region of the extremities A of arm of the laminated stack as well as reduce motor noise in use.

13 Claims, 1 Drawing Sheet

ELECTRIC MOTOR ARMATURE WITH WINDING END PROTECTION

The present invention relates to an electric motor. More particularly, the invention relates to a wound armature for an electric motor having a laminated stack and to an electric motor incorporating such an armature.

Such armatures are conventionally made from a stack of steel laminations which stack comprise a plurality of mushroom or T-shaped laminations with their stems extending radially out from a central hub which fits on a motor shaft. Each stem has arms which extend circumferentially of the rotational axis of the motor on each side of the stem. Wire is wrapped tightly around the stems of the stack to form armature windings. The wire used usually has a polymer coating to provide insulation between each of the wire turns and between the wire and stack.

It is necessary to wind the wire under a tension in order to ensure that the windings are tightly packed and avoid chaffing between the wire and stack. It has been found that when the wire is wound onto the stems, cuts may be formed into the layer of insulation coating the wire due to the tension under which the wire is wound. A simple "spider" comprising a spoked plastic disc may be placed against the outer surface of each end lamination to prevent damage to the wound wires of each coil.

BRIEF DESCRIPTION OF THE INVENTION

According to the invention there is provided an armature, for an electric motor, including a rotary shaft, the armature being supported on the shaft and having a lamination stack, the stack comprising a plurality of T-shaped steel laminations stacked one against another, each lamination having radially extending stems with arms which extend circumferentially with respect to the rotational axis of the shaft each side of the stems, armature windings wrapped around the stems of the stack, a spider at one end of the stack positioned inside the armature windings and formed of electrically insulating material and having a plurality of profiled spokes, the spokes each have one surface which fits against and covers a respective stem of the stack and an opposing arcuate surface to form a central upstanding profile extending to adjacent a radially remote end of the respective spoke, and arms extending circumferentially each side of the spoke at the end of the spoke to partly cover respective arms of the stack.

The spider may have a central boss which extends axially beyond a surface of each spoke and snugly fits over the shaft.

The spider is preferably profiled over the whole length of its spokes to provide a smooth curved base against which the wires of the armature windings are urged at each end of the stack when the windings are formed.

BRIEF DESCRIPTION OF THE DRAWINGS

The invention will be further described by way of example with reference to the accompanying drawings, in which.

DETAILED DESCRIPTION OF THE INVENTION

Figure 1:
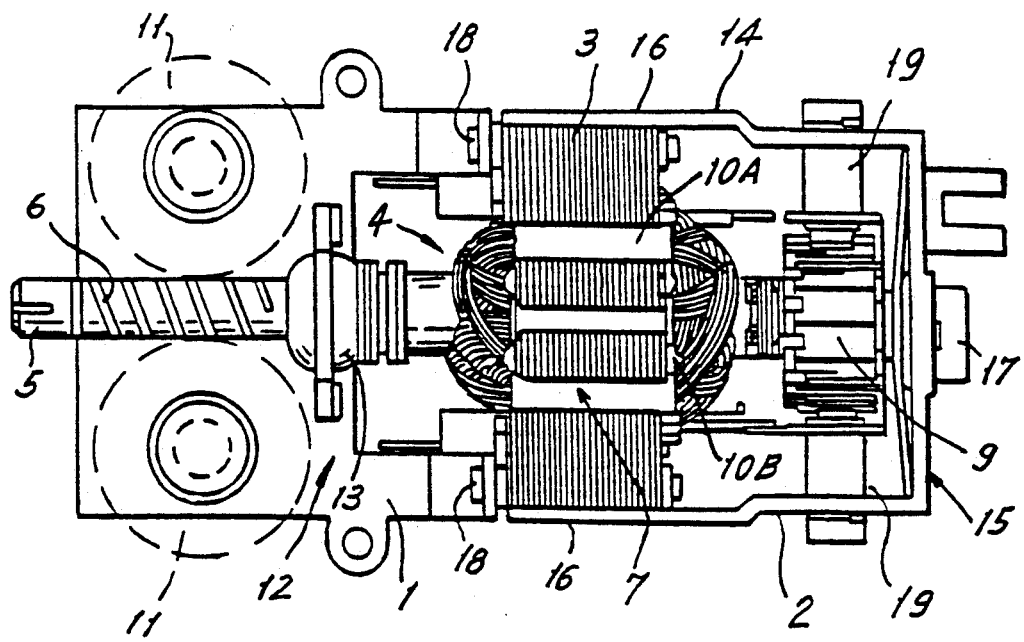
FIG. 1 is a plan view of a fractional horsepower universal motor embodying the invention.

Referring to the drawings in FIG. 1, a universal motor for a food mixer comprises a pressed steel frame in two parts 1, 2. The frame parts 1, 2 are joined to opposite sides of a U-shaped laminated stator 3. A rotor 4 of the motor comprises a shaft 5 having a worm 6 at one end and carrying an armature 7, with armature windings 8, and a commutator 9. The armature is formed as a laminated stack 3 of a plurality of T-shaped laminations and spiders 10A and 10B are mounted at each respective end of the stack 3. Brushgear 19 is mounted on the frame part 2 and supplies current to the commutator 9. The frame part 1 carries two implement holders 11, shown in dotted outline, for holding food beaters or the like, which mesh with the worm 6.

The frame part 1 comprises a bearing support part 12 for a bearing 13. The frame part 2 comprises two arms 14 which extend on opposite sides of the commutator 9 and are joined at their first ends by a bearing support or rear wall 15 and are mounted at their second ends 16 on the stator 3. Rear wall 15 is dished to receive a bearing 17 for the motor shaft 5.

The frame parts 1 and 2 are held on the stack 3 by means of two screws 18. The frame part 2 carries brushgear 19, which comprises a plastics brush frame which straddles the commutator 9.

To assemble the armature, the spiders 10A and 10B are placed on the shaft at either end of the laminated stack. The spiders are formed of non-conducting material and have almost the same cross-section in elevation as the steel laminations (see below). The spiders 10A and 10B are slidingly fitted on the shaft 3 to line up against the stack 3. The commutator 9 is then fitted on the shaft 5 and the armature is then wound with wire in the normal way to form the windings 8.

The spider 10A, at least, is formed and shaped in a particular manner in accordance with the present invention.

Figure 2:
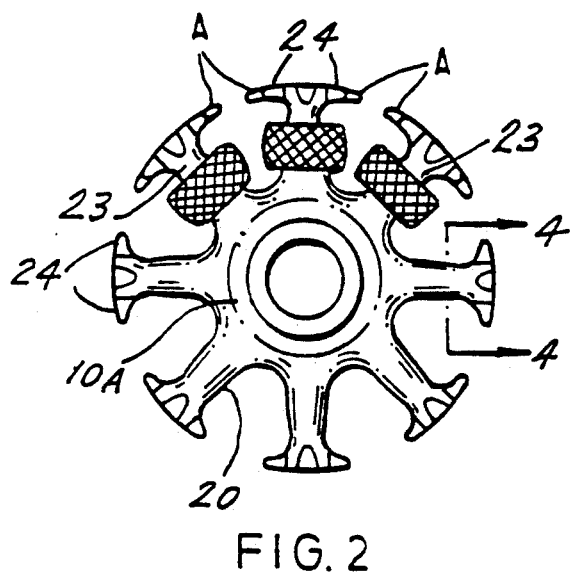
FIG. 2 is an elevation of a spider for an armature of the motor showing, in part, armature windings and one end of an armature stack.
Figure 3:
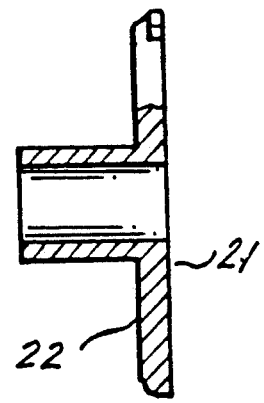
FIG. 3 is a part-sectional side view of the spider.
Figure 4:
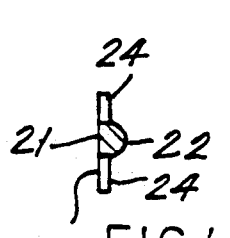
FIG. 4 is a sectional view along IV—IV of FIG. 2.
Figure 5:
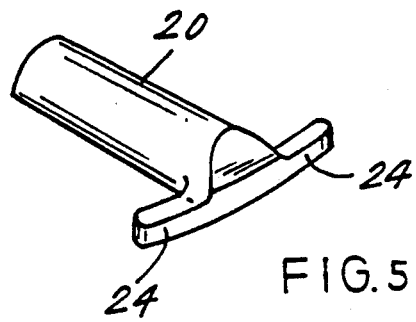
FIG. 5 is an enlarged isometric view of a radially remote end of one spoke of the spider.

The spider 10A is better seen in FIGS. 2 to 6. Importantly, it will be seen that the spider 10A has a plurality of profiled spokes 20 (see especially FIG. 4). One surface of each spoke comprises a mating planar surface 21 which fits snugly against a respective end face of the armature stack 3. An opposing upstanding profiled surface 22 of each spoke consists of an arcuate surface against part of which wires of the armature windings 8 bear. In FIG. 2, the armature windings are shown for illustration purposes on only three of the spokes 20.

The spider 10A protects the wires from bearing directly against sharp corner edges of stems of the laminations and supports the wires as they are turned around the ends of the armature stack 3 during winding. Exposed parts 23 of the surfaces 22, that is those parts not covered with wires of the armature windings, present an arcuate surface to any cooling medium, usually air, which in use is forced axially through the motor past the spider 10A. Even where no forced cooling is applied, the exposed and profiled surfaces 23 generate less turbulent disturbance of surrounding air than a non-profiled surface, so that the described motor, which is designed to run at high rotational speeds, produces less noise.

The spokes 20 are formed integrally with circumferentially extending arms 24, which are preferably thinner in an axial direction than the axial depth of the spokes 20, at each side at their ends to partly cover respective arms of the laminations. It will be seen at A (FIG. 2) that the lamination arms extend somewhat beyond the ends of the arms 24. In other words, the spokes 20 of the spider 10A have generally the same cross-section as the stems of the lamination stack but the arms 24 do not completely cover the arms of the laminations. It will also be noted (see FIG. 5) that the transitions between the arms and the spokes is smoothly curved to streamline the transitions in the direction of rotational movement of the spider.

The spider 10A serves a further purpose. As the motor brushes wear in use, carbon dust is released and tends to be blown axially through the motor and along the inside of the armature 7. Some of the dust normally tends to collect on one end of the armature and can build up to create electrical shorts between the armature wires and the exposed edges A of the end lamination and even short to the motor casing. Because the stems of the laminations, at least at the one end next to the brush gear, are covered by the spokes 20 and the arms of the laminations are partly covered by the arms 24, carbon dust no longer tend to build up against the end of the lamination stack. This is because the spokes 20 are profiled and shaped as described and shown so that drag in the region of the end laminations is reduced and air currents more readily carry the carbon dust through the motor and away from the end lamination. The reduction of drag in any event encourages better air flow patterns so reducing the motor temperature in use and so improve the motor efficiency.

It will be noted as stated that the arms 24 do not completely cover the respective arms of the end lamination. There is in practice little tendency where the spider 10A is provided and shaped as described for dust to remain on the small uncovered areas A due to the profiling of the spokes. Nor does dust accumulate at the small step-downs where the arms 24 terminate against the surfaces of the arms of the laminations. As the arms 24 have little inherent strength, they are deliberately made somewhat shorter than the arms of the laminations so as not to be subjected to undue strain when the armature wires are being wound onto the lamination stack. Further, the described arms 24 do not interfere in any way with the feeding of armature wires on to the lamination stack as the armature is wound, or become damaged during winding.

As mentioned earlier, simple spiders may be normally provided primarily to prevent scuffing of armature winding wires at the ends of a laminated stack. However, the spiders 10A are especially profiled normally along the full length of each spoke 20, but importantly the profile extends or is present in the region not covered by the armature windings and extends to the radially remote end of each spoke. This enhances the aerodynamic performance of the armature to reduce noise, reduce the build up of carbon dust as described (which may result in shorting) and reduces drag. In other words, armatures with spiders 10A, according to the invention and fitted at least at one end of the armature stack, enable more reliable and more efficient motors to be manufactured. The spider 10B may be for example a "simple spider".

The spiders 10A are readily formed by plastic molding techniques and can be "profiled" to further suit different shaped armature laminations and/or different applications. A compromise in the profiling may be chosen for example to particularly reduce noise in situations where the build-up of carbon dust is expected to be less of a problem. The exposed surfaces 23 of the spokes are then less rounded or flatter in profile than say the non-exposed parts of the spokes. In any event, suitable profiles can be developed and easily reproduced which provide optimum characteristics for removal of carbon dust or reduction of drag, and/or reduction of noise.

Various modifications may be made to the described embodiment and it is desired to include all such modifications as fall within the scope of the accompanying claims.

We claim:

1. An armature, for an electric motor, including a rotary shaft, the armature being supported on the shaft and having a lamination stack, the stack comprising a plurality of T-shaped steel laminations stacked one against another, each lamination having radially extending stems with arms which extend circumferentially, with respect to the rotational axis of the shaft, from each side of the stems, armature windings wrapped around the stems of the stack, a spider located at one end of the stack positioned inside the armature windings and formed of electrically insulating material and having a plurality of profiled spokes, the spokes each having one surface which overlies and fits against a respective stem of the stack and an opposing arcuate surface to form a central upstanding profile extending to a point which is adjacent a radially remote end of the respective spoke, and spider arms extending circumferentially from each side of the spoke at the end of the spoke to overlie respective arms of the stack, each of said spokes being partly defined by spaced radially extending first and second edges, said arcuate surface being defined by a curve that extends from the first edge to the second edge.

2. An armature according to claim 1, in which the spider arms are thinner in the axial direction than the axial thickness of the upstanding profile.

3. An armature according to claim 2, in which the transition between the ends of the spokes and the spider arms are smoothly curved to be streamlined in the direction of rotational movement of the spider.

4. An armature according to claim 1, in which the spider has a central boss which extends axially beyond a surface of each spoke and snugly fits over the shaft.

5. A universal motor having an armature according to claim 1.

6. An armature for an electric motor, comprising:
a lamination stack having a sharp edge at an axial end thereof;
a cover located at the axial end of the lamination stack for covering the sharp edge and for providing an arcuate edge at the axial end of the lamination stack;
a winding wound onto a portion of the lamination stack and over the arcuate edge of the cover, the winding including a wire having an insulation coating thereon, the arcuate edge of the cover avoiding breakage of the insulation coating and reducing noise by gasses passing through the motor;
said spider including a plurality of radially extending spokes, and each of said spokes includes respective first and second arms circumferentially extending from opposite sides, respectively, of a distal end of the spoke;

said second arms being thinner in an axial direction than the axial thickness of the spokes; and smoothly curved transitions between each spoke and each of the first and second arms extending therefrom, said smoothly curved transitions being streamlined in the direction of rotational movement of said spider.

7. A armature according to claim 6, wherein the spider also includes a central boss with the plurality of spokes radially extending from the boss, each of the spokes having a respective arcuate edge at an axial end of the lamination stack and wherein the winding is wound around the arcuate edge of each of the spokes of the spider, the arcuate edge of each of the spokes avoiding breakage of the insulation coating and reducing noises by gasses passing through the motor.

8. An armature according to claim 6, wherein the first and second arms extending from opposite sides of a distal end of the spoke only partly cover respective arms of the stack.

9. An armature according to claim 6, wherein the cover comprises a first generally planar surface for contacting the axial end of the lamination stack and an opposing arcuate surface for providing the arcuate edge at the axial end of the lamination stack.

10. An armature according to claim 6, wherein the cover comprises an electrically insulating material.

11. An armature, for an electric motor, including a rotary shaft, the armature being supported on the shaft and having a lamination stack, the stack comprising a plurality of T-shaped steel laminations stacked one against another, each lamination having radially extending stems with arms which extend circumferentially, with respect to the rotational axis of the shaft, from each side of the stems, armature windings wrapped around the stems of the stack, a spider located at one end of the stack positioned inside the armature windings and formed of electrically insulating material and having a plurality of profiled spokes, the spokes each having one surface which overlies and fits against a respective stem of the stack and an opposing arcuate surface to form a central upstanding profile extending to a point which is adjacent a radially remote end of the respective spoke, and spider arms extending circumferentially each side of the spoke at the end of the spoke to overlie respective arms of the stack, and smoothly curved transitions between the ends of the spokes and the arms, said smoothly curved transitions being streamlined in the direction of rotational movement of the spider, and said spider arms being thinner in the axial direction than the axial thickness of the upstanding profile.

12. A universal motor having an armature according to claim 11.

13. An armature according to claim 1 in which said one surface is flat and extends from the first edge to the second edge.

* * * * *